(12) United States Patent
Choi et al.

(10) Patent No.: US 8,924,146 B2
(45) Date of Patent: Dec. 30, 2014

(54) DRIVE MODE GUIDE SYSTEM FOR VEHICLE AND METHOD THEREOF

(75) Inventors: Seunggil Choi, Gyeonggi-do (KR);
Jeong Woo Lee, Gyeonggi-do (KR);
Jung Do Kee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 274 days.

(21) Appl. No.: 13/536,316

(22) Filed: Jun. 28, 2012

(65) Prior Publication Data

US 2013/0151142 A1   Jun. 13, 2013

(30) Foreign Application Priority Data

Dec. 12, 2011   (KR) .................. 10-2011-0132874

(51) Int. Cl.
*G01C 21/34*   (2006.01)

(52) U.S. Cl.
USPC .......... 701/423; 701/22; 701/25; 701/36; 701/201; 701/207; 701/208; 701/210; 701/211; 704/270; 705/52; 709/223; 340/942; 340/995.1; 340/995.27

(58) Field of Classification Search
USPC ............ 701/22, 25, 36, 201, 207, 208, 210, 701/211, 423; 704/270; 705/52; 709/223; 340/942, 995.1, 995.27
See application file for complete search history.

(56) References Cited

U.S. PATENT DOCUMENTS

| | | | |
|---|---|---|---|
| 2001/0037305 A1* | 11/2001 | Mochizuki ...................... 705/52 |
| 2002/0000921 A1* | 1/2002 | Hutchinson ................... 340/942 |
| 2002/0120728 A1* | 8/2002 | Braatz et al. .................. 709/223 |
| 2003/0033083 A1* | 2/2003 | Nakashima et al. .......... 701/211 |
| 2004/0204846 A1* | 10/2004 | Yano et al. ..................... 701/210 |
| 2006/0139184 A1* | 6/2006 | Hong ........................ 340/995.1 |
| 2006/0142915 A1* | 6/2006 | Isono et al. ...................... 701/36 |
| 2006/0161440 A1* | 7/2006 | Nakayama et al. ........... 704/270 |
| 2008/0238724 A1* | 10/2008 | Shin ........................ 340/995.27 |
| 2008/0243374 A1* | 10/2008 | Hatazawa ..................... 701/208 |
| 2008/0243382 A1* | 10/2008 | Chu ............................... 701/211 |
| 2009/0043493 A1* | 2/2009 | Sakai ............................. 701/207 |
| 2009/0259354 A1* | 10/2009 | Krupadanam et al. .......... 701/22 |
| 2009/0299563 A1* | 12/2009 | Mikosza ......................... 701/25 |
| 2010/0223000 A1* | 9/2010 | Nakae et al. .................. 701/201 |
| 2011/0093190 A1* | 4/2011 | Yoon .............................. 701/201 |
| 2013/0151142 A1* | 6/2013 | Choi et al. .................... 701/423 |

FOREIGN PATENT DOCUMENTS

| | | | |
|---|---|---|---|
| JP | 2008-082944 A | 4/2008 |
| JP | 2009-012605 A | 1/2009 |
| JP | 2011020571 A | 2/2011 |

\* cited by examiner

*Primary Examiner* — James Trammell
*Assistant Examiner* — Sanjeev Malhotra
(74) *Attorney, Agent, or Firm* — Edwards Wildman Palmer LLP; Peter F. Corless

(57) ABSTRACT

Disclosed is drive mode guide system for a vehicle provided with a plurality of drive modes. More specifically, a road information storage unit stores information related a road state. A real-time information storage unit receives and stores environmental information in real time. A vehicle information storage unit stores information related to the vehicle. A control unit then extracts a possible-traveling path and a drive mode and an outputs the possible-traveling path. A suggested drive mode received from the control unit based on the information stored in the road information storage unit, the real-time information storage unit, and the vehicle information storage unit.

13 Claims, 3 Drawing Sheets

DRIVE MODE GUIDE SYSTEM FOR VEHICLE AND METHOD THEREOF

CROSS-REFERENCE TO RELATED APPLICATION

This application claims priority to and the benefit of Korean Patent Application No. 10-2011-0132874 filed in the Korean Intellectual Property Office on Dec. 12, 2011, the entire contents of which are incorporated herein by reference.

BACKGROUND OF THE INVENTION (a) Field of the Invention

The present invention relates to a drive mode guide system and a method thereof, and more particularly, to a drive mode guide system for an electric vehicle and a drive mode guide output method using the system.

(b) Description of the Related Art

In general, electric vehicles are provided with a plurality of drive modes for vehicle operation. In particular, the drive modes include a general mode which allows a vehicle to travel according to the user's acceleration request, an echo mode of controlling a vehicle to maintain an optimum fuel efficiency, and a sports mode that is configured to increase the dynamic performance of the vehicle. The drive modes are set in consideration of vehicle systems, such as the vehicles provided motor or power system.

However, the amount of consumed energy changes during actual travel over a road due to a change in vehicle speed and a change in vehicle load as a result of certain road conditions (e.g., an inclination or the curvature of the road) and/or traveling environments (e.g., cross wind, etc.), when a vehicle travelling over a road. In particular, for electric vehicles, the energy consumption of the vehicles rapidly changes in accordance with the traveling state of the vehicle, regenerative braking, operation of an air conditioner system, the user's driving habits, and air resistance. Therefore, although a driver selects one of these drive modes, a vehicle cannot always effectuate any one of these driving modes if these factors are not also taken into consideration.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a drive mode guide system that assists a user in selecting an optimum drive mode based on a particular traveling path of a vehicle and an output method thereof.

More specifically, an exemplary embodiment of the present invention provides a drive mode guide system for a vehicle provided with a plurality of drive modes. In particular, the drive mode guide system includes an input unit configured to receive input data related to a traveling destination of a user; a road information storage unit configured to store information related to a road state; a real-time information storage unit configured to receive and store environmental information in real time; a vehicle information storage unit configured to store information related to the vehicle; a control unit configured to extract a possible-traveling path and a drive mode for the vehicle; and an output unit configured to output the possible-traveling path and the drive mode received from the control unit.

In particular, the control unit extracts the possible-traveling path for the vehicle from the traveling destination received from the input unit, extracts an expected consumed energy flow for the possible-traveling path from information received from the road information storage unit, the real-time information storage unit, and the vehicle information storage unit, and extracts a drive mode suitable for the expected consumed energy flow for the possible-traveling path and the traveling information from the plurality of drive modes.

The control unit may extract a plurality of possible-traveling paths for a vehicle from the information inputted to the input unit, extract the expected consumed energy flow for each of the plurality of possible-traveling paths, and extract a drive mode suitable for the expected consumed energy flow from for each of the possible-traveling path and the traveling information.

The expected consumed energy flow may be extracted by: calculating a dynamic load state that is applied to the vehicle during virtual travel through the possible-traveling path from the information received from the road information storage unit, the real-time information storage unit, and the vehicle information storage unit; calculating a fluid resistance state that is applied to the vehicle during virtual traveling through the possible-traveling path from the information received from the real-time information storage unit and the vehicle information storage unit; calculating a fuel consumption state of the vehicle during virtual travel through the possible-traveling path from the information on the calculated dynamic load state and fluid resistance state of the vehicle; and calculating a heat load state of the vehicle from the information received from the vehicle information storage unit in consideration of the energy flow in the vehicle.

In some exemplary embodiments of the present invention, the road state information stored in the road information storage unit may include geographical characteristics of the road and the traffic rule information of the road. The environmental information stored in the real-time information storage unit may include real-time road traffic situation information and weather information. The vehicle state information stored in the vehicle information storage unit may include heat load state information of the vehicle.

Another exemplary embodiment of the present invention provides a drive mode guide output method of a drive mode guide system for a vehicle including a plurality of drive modes, that includes: inputting, in an input unit, a traveling destination of a user; extracting, by a control unit, a possible-traveling path for the vehicle from the inputted traveling destination; collecting, by the control unit, road state information on the extracted possible-traveling path for the vehicle, real-time environmental information, and vehicle information; extracting, by the control unit, an expected consumed energy flow from the collected road state information, real-time environmental information, and vehicle information; extracting, by the control unit, a drive mode suitable for the expected consumed energy flow for the possible-traveling path and the traveling information from the plurality of drive modes; and outputting, by the control unit, the extracted drive mode. When a plurality of possible-traveling paths for the vehicle are extracted, the expected consumed energy flow may be extracted for each of the possible-traveling path by the control unit as well.

The method may further include extracting, by the control unit, a possible-traveling path with the minimum energy consumption from the plurality of possible-traveling paths in consideration of the expected consumed energy flow extracted for each of the possible-traveling paths.

The extracting of an expected consumed energy flow may include: calculating, by the control unit, a dynamic load state that is applied to the vehicle while virtual traveling through the possible-traveling path from the road state information, the real-time environmental information, and the vehicle information; calculating, by the control unit, a fluid resistance state that is applied to the vehicle during virtual travel through the possible-traveling path from the real-time environmental information and the vehicle information; calculating, by the control unit, a fuel consumption state of the vehicle during virtual travel through the possible-traveling path from the information on the calculated dynamic load state and fluid resistance state of the vehicle; and calculating a heat load state of the vehicle from the vehicle information in consideration of an energy flow in the vehicle.

The road state information may include at least any one of geographical characteristics of the road and traffic rule information of the road. The real-time environmental information may include at least any one of real-time road traffic situation information and weather information. The vehicle state information may include heat load state information of the vehicle.

According to the exemplary embodiments of the present invention, it is possible to guide a user with an optimum drive mode for the traveling path of a vehicle, and to provide a drive mode with the minimum energy consumption when a vehicle travels.

DESCRIPTION OF SYMBOLS

Figure 1:
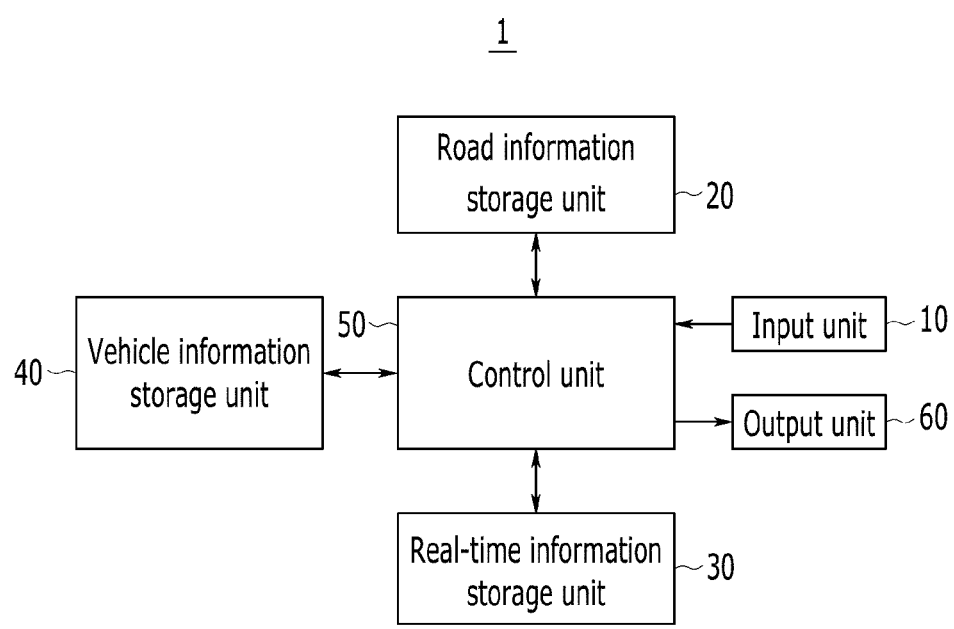
FIG. 1 is a diagram schematically illustrating a drive mode guide system for a vehicle according to an exemplary embodiment of the present invention.

1: Drive mode guide system for vehicle
10: Input unit
20: Road information storage unit
30: Real-time information storage unit
40: Vehicle information storage unit
50: Control unit
60: Output unit

DETAILED DESCRIPTION OF THE EMBODIMENTS

Hereinafter, the present invention will be described with reference to the accompanying drawings, based an exemplary embodiment of the present invention, for those skilled in the art to easily implement the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

Furthermore, control logic utilized to execute the exemplary embodiments of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Furthermore, the control unit described herein may be embodied as a single control unit or as a plurality of control units without departing from the overall concept and intent of the illustrative embodiment of the present invention.

The exemplary embodiment is an exemplary embodiment of the present invention and may be implemented in various ways by those skilled in the art, and thus the scope of the present invention is not limited to the embodiment that will be described hereafter.

FIG. 1 is a diagram schematically illustrating a drive mode guide system 1 for a vehicle according to an exemplary embodiment of the present invention. The drive mode guide system 1 for a vehicle extracts and guides/suggests a drive mode in consideration of expected consumed energy according to a possible-traveling path in a vehicle provided with a plurality of drive modes.

Referring to FIG. 1, the drive mode guide system 1 for a vehicle includes an input unit 10, a road information storage unit 20, a real-time storage unit 30, a vehicle information storage unit 40, a control unit 50, and an output unit 60. When a destination is inputted by operation of a user, the input unit 10 transmits the destination to the control unit 50. The road information storage unit 20 stores the information on a road state and transmits road state information to the traveling destination inputted to the input unit 10 to the control unit 50. The road state information may include geographical characteristics of the road, such as the position, inclination, and curvature of the road, and the information related to traffic rules of the road, such as the speed limit and/or signal system. The road information storage unit 20 may be map data of a traveling path guide device, such as a navigation device in a vehicle. The map data may be three-dimensional map data that provides three-dimensional road state information, such as the inclination of a road.

The real-time information storage unit 30 may be configured to receive and store environmental information in real time and transmit the environmental information to the traveling destination inputted to the input unit 10 to the control unit 50. That is, the real-time environmental information may include the information related to a road traffic situation, such as a congested section of a road due to a traffic accident or road construction, and weather information such as snow, rain, or the direction and speed of wind.

The vehicle information storage unit 40 stores the information related to the vehicle. The vehicle information storage unit 40 may store, for example, driving system information, air-conditioning system information, exhaust system information, vehicle body structure information, and the like, and provides load information such as a dynamic load of the vehicle itself, fluid resistance, and heat load to help calculate the vehicle's actual fuel consumption.

The control unit 50 extracts a possible-traveling path for the vehicle based on the destination information inputted to the input unit 10. As the possible-traveling path for a vehicle, paths through which a vehicle can reach the traveling destination are provided, and a plurality of various paths, such as the minimum distance path and a minimum time path, may be provided as well.

Further, the control unit 50 may be configured to extract an expected consumed energy flow for the possible-traveling path based on the information received from the road information storage unit 20, the real-time information storage unit 30, and the vehicle information storage unit 40. The expected consumed energy flow for the possible-traveling path is energy that can be consumed under the assumption of how a vehicle travels through a possible-traveling path, and is extracted based on the dynamic load state, the fluid resistance state, the fuel consumption state, and the heat load state of the vehicle.

The dynamic load state of a vehicle refers to a dynamic load generated in the vehicle itself and a dynamic load generated due to a change in environment except for the vehicle when the vehicle travels, and depends on a road state, such as the position, inclination, and curvature of a road, and a road traffic situation. Therefore, control unit 50 calculates the dynamic load state applied to a vehicle during virtual traveling through a possible-traveling path from the information received from the road information storage unit 20 and the real-time information storage unit 30.

The fluid resistance state of a vehicle refers to a resistance due to the flow of fluid (e.g., air) around the vehicle when the vehicle is traveling and depends on traffic and weather information. Therefore, the control unit 50 calculates a fluid resistance state applied to a vehicle during virtual travel through a possible-traveling path from the information received from the real-time information storage unit 30 and the vehicle information.

Further, the control unit 50 may also be configured to calculate the amount of fuel that is consumed during virtual travel through a possible-traveling path from the calculated dynamic load and fluid resistance state of the vehicle. Thus, the energy flow in the vehicle is extracted by the above process. In this process, the control unit 50 extracts the heat load state generated in the vehicle during virtual travel through a possible-traveling path from the air-conditioning system information of the vehicle and the energy flow in the vehicle which are received from the vehicle information storage unit 40. The control unit 50 may extract expected consumed energy flow during virtual travel through a possible-traveling path from the information on the dynamic load state, the fluid resistance state, the fuel consumption state, and the heat load state of the vehicle.

Further, the control unit 50 may be configured to extract a drive mode suitable for the expected consumed energy flow for the possible-traveling path based on traveling information for the possible-traveling path, that is, the road state information or the real-time environmental information which are described above.

In detail, the control unit 50 controls the vehicle, using various kinds of drive modes based on the vehicle information. For example, the drive mode may be a general mode that allows a vehicle to travel based on the user requested acceleration in a typical manner, an echo mode configured to maintain an optimum fuel efficiency for the vehicle regardless of the user's requested acceleration, and a sports mode configured to increase dynamic performance of the vehicle. Advantageously, a control unit 50 extracts a drive mode suitable for an expected consumed energy flow for a possible-traveling path in the provided drive modes to suggest to the user the best possible driving mode.

The output unit provides the user with the possible-traveling path and the drive mode received from the control unit 50. In detail, the output unit outputs the drive mode suitable for the possible-traveling path and the possible-traveling path, thereby providing the user with information which can be used to select the appropriate route and drive mode for that route.

A guide method using the drive mode guide system 1 for a vehicle described above is as follows.

Figure 2:
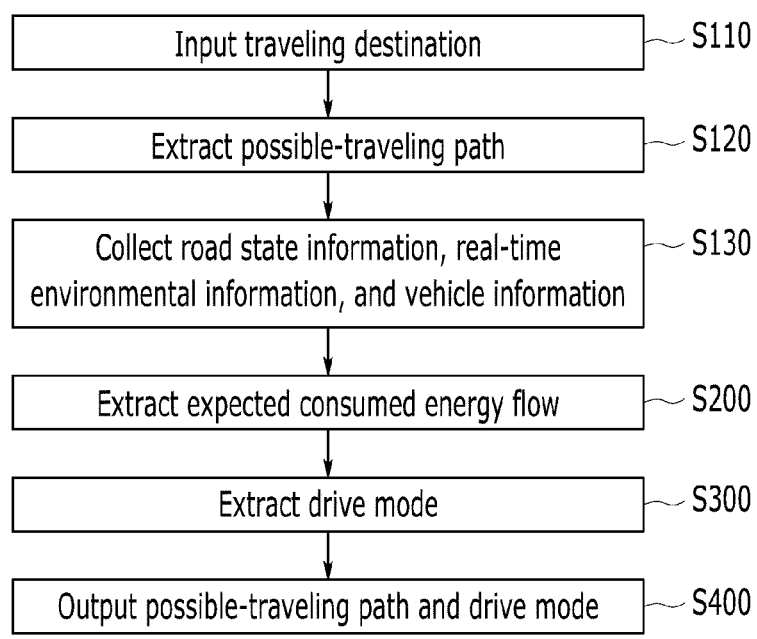
FIG. 2 and FIG. 3 are diagrams illustrating a flow of a drive mode guide method for a vehicle according to an exemplary embodiment of the present invention.
Figure 3:
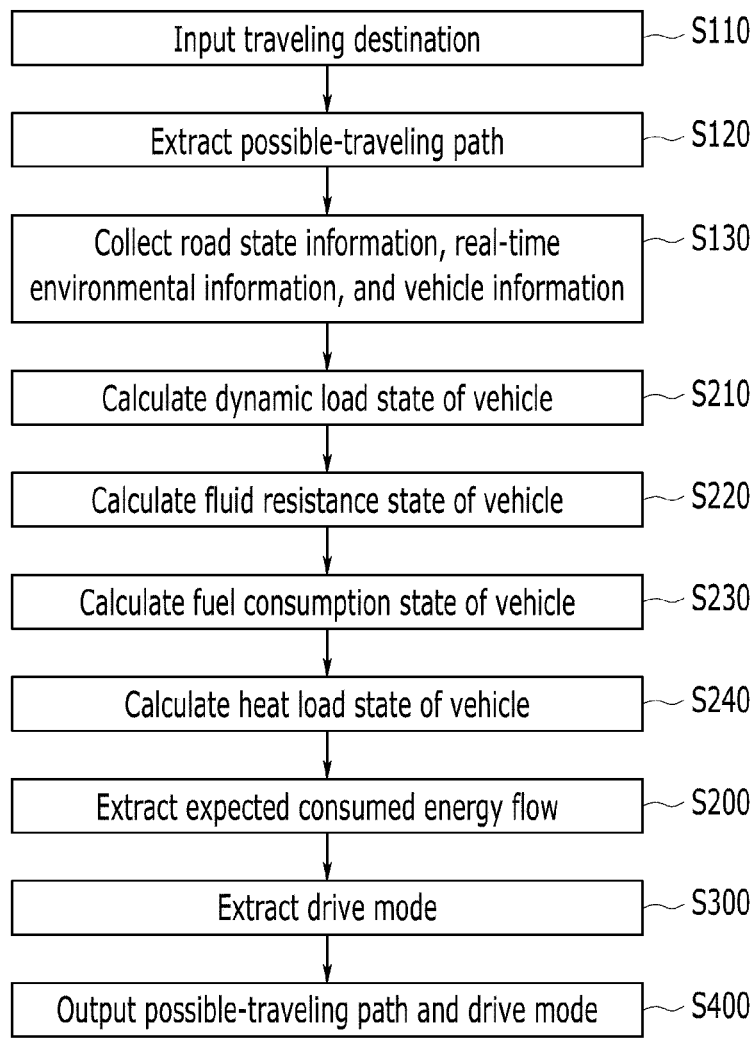

FIGS. 2 and 3 are diagrams illustrating a flow of a drive mode guide method for a vehicle according to an exemplary embodiment of the present invention. Referring to FIGS. 2 and 3, a drive mode guide method for a vehicle calculates an expected energy flow for a plurality of possible-traveling paths and provides a drive mode suitable for the energy flow over those possible traveling paths. When a user inputs a destination into the input unit 10 (S110), the control unit 50 extracts a possible-traveling path for the vehicle from the destination received from the input unit 10 (S120). The possible-traveling path is divided over a plurality of intervals.

The control unit 50 then may extract the road state information related to the possible-traveling paths for the vehicle, the rear-time environmental information, and the vehicle information from the road information storage unit 20, the real-time information storage unit 30, and the vehicle information storage unit 40 (S130). In detail, the road state information, the real-time environmental information, and the vehicle information are extracted for each divided interval over the traveling path.

When the road state information is extracted, the control unit 50 determines whether the user has utilized that path before, and when the user has utilized that path or the path has been stored in advance, the road state information may be extracted through a stored database. However, when the user has not utilized that path or the path has not been stored in advance, the road state information is extracted from the road information storage unit 20. The control unit 50 extracts an expected consumed energy flow from the road state information over the possible-traveling path, the real-time environmental information, and the vehicle information (S200).

As described above, the expected consumed energy flow is extracted from the dynamic load state, the fluid resistance state, the fuel consumption state, and the heat load state of the vehicle.

In detail, the control unit 50 calculates a dynamic load state that is applied to the vehicle during virtual travel over the possible-traveling path from the road state information, the real-time environmental information, and the vehicle information (S210) and calculates a fluid resistance state that is applied to the vehicle during virtual travel through the possible-traveling path from the real-time environmental information and the vehicle information (S220). Further, the control unit 50 calculates a fuel consumption rate of the vehicle from the information on the dynamic road state and fluid resistance state of the vehicle that are generated during virtual travel through the possible-traveling path (S230). From this data, the control unit 50 may extract the energy flow in the vehicle.

After this process has completed or simultaneously, the control unit 50 may determine the heat load state generated in the vehicle in consideration of the energy flow in the vehicle and can extract the minimum heat load on the vehicle of that possible path (S240). Through this process, the control unit 50 may estimate the minimum energy flow that is consumed when the vehicle travels through the possible-traveling path. Thus, it is possible to extract the expected consumed energy flow (S200).

The control unit 50 extracts a drive mode suitable for the expected consumed energy flow and the traveling information for the possible-traveling path (S300). In detail, when the vehicle travels over the possible-traveling path, the control unit 50 extracts a suitable drive mode based on the traveling information such as the energy flow consumed over the path, the road state information, and the real-time environmental information. That is, the drive mode that is most suitable based on information provided to the control unit 50 is extracted. The output unit then provides the user with the information by outputting the possible-traveling path and the drive mode received from the control unit 50 (S400).

An exemplary embodiment with one possible-traveling path was described above. However, the present invention is not limited thereto and may be applied to when a plurality of possible-traveling paths are provided. When a plurality of possible-traveling paths are provided, it is possible to provide the user with a suggested drive mode by extracting the expected consumed energy flow for a possible-traveling path selected by the user from the plurality of possible-traveling paths. Further, it is possible to extract the expected consumed energy flows and the drive modes for all of the plurality of possible-traveling paths and then provide the user with them accordingly.

Further, it is possible to extract the expected consumed energy flows for the plurality of possible-traveling paths and extract the path with the minimum energy consumption from the energy flows, and then provide the user with a suggested drive mode suitable for the path with the minimum energy consumption. The exemplary embodiment may be applied to a vehicle provided with a plurality of drive modes. In particular, the exemplary embodiment may be applied to an electric vehicle that uses motor power from a battery for traveling.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A drive mode guide system for a vehicle provided with a plurality of drive modes, comprising:
    an input unit configured to receive data input by the user, wherein the data input by the user is destination data;
    a road information storage unit configured to store information related to a road state;
    a real-time information storage unit configured to receive and store environmental information in real time;
    a vehicle information storage unit configured to store information related to the vehicle;
    a control unit configured to extract a possible-traveling path and a drive mode for the vehicle based on the real-time information, vehicle information and road state information; and
    an output unit configured to output the possible-traveling path and the drive mode received from the control unit,
    wherein the control unit is configured to:
        extract the possible-traveling path for the vehicle from the destination data received from the input unit,
        extract an expected consumed energy flow for the possible-traveling path from information received from the road information storage unit, the real-time information storage unit, and the vehicle information storage unit, and
        extract a drive mode suitable for the expected consumed energy flow for the possible-traveling path and the traveling information from the plurality of drive modes, wherein the expected consumed energy flow is extracted by configuring the control unit to:
            calculate a dynamic load state applied to the vehicle during virtual travel through the possible-traveling path from information received from the road information storage unit, the real-time information storage unit, and the vehicle information storage unit;
            calculate a fluid resistance state applied to the vehicle during the virtual travel through the possible-traveling path from information received from the real-time information storage unit and the vehicle information storage unit;
            calculate a fuel consumption rage of the vehicle during virtual travel through the possible-traveling path from information on the calculated dynamic load state and fluid resistance state of the vehicle; and
            calculate a heat load state of the vehicle from information received from the vehicle information storage unit based on the expected energy flow in the vehicle.

2. The system of claim 1, wherein the control unit is further configured to:
    extract a plurality of possible-traveling paths for the vehicle from information inputted to the input unit,
    extract the expected consumed energy flow for each of the plurality of possible-traveling paths,
    extract a possible-traveling path with minimum energy consumption from the plurality of possible-traveling paths in consideration of the expected consumed energy flow for each of the possible-traveling paths, and
    extract a drive mode suitable for the traveling information of the possible-traveling path with the minimum energy consumption.

3. The system of claim 1, wherein the control unit further configured to:
    extract a plurality of possible-traveling paths of the vehicle from the information inputted to the input unit,
    extract the expected consumed energy flow for each of the plurality of possible-traveling paths, and
    extract a drive mode suitable for the expected consumed energy flow and the traveling information for each of the possible-traveling paths.

4. The system of claim 1, wherein:
the road state information stored in the road information storage unit includes geographical characteristics of the road and traffic rule information of the road.

5. The system of claim 1, wherein:
the environmental information stored in the real-time information storage unit includes real-time road traffic situation information and weather information.

6. The system of claim 1, wherein:
the vehicle state information stored in the vehicle information storage unit includes heat load state information of the vehicle.

7. A drive mode guide output method of a drive mode guide system for a vehicle including a plurality of drive modes, the method comprising:
    inputting a destination;
    extracting, by a control unit, a possible-traveling path for the vehicle from the inputted destination;
    collecting, by the control unit, road state information related to the extracted possible-traveling path for the vehicle, real-time environmental information, and vehicle information;
    extracting, by the control unit, an expected consumed energy flow from the collected road state information, real-time environmental information, and vehicle information, wherein the expected consumed energy flow is extracted by:
  calculating a dynamic load state applied to the vehicle during virtual travel through the possible-traveling path from information received from the road information storage unit, the real-time information storage unit, and the vehicle information storage unit,
  calculating a fluid resistance state applied to the vehicle during virtual travel through the possible-traveling path from information received from the real-time information storage unit and the vehicle information storage unit,
  calculating a fuel consumption rate of the vehicle during virtual travel through the possible-traveling path from information on the calculated dynamic load state and fluid resistance state of the vehicle, and
  calculating a heat load state of the vehicle from information received from the vehicle information storage unit based on the expected energy flow in the vehicle;
extracting, by the control unit, a suggested drive mode suitable for the expected consumed energy flow for the possible-traveling path and the traveling information from the plurality of drive modes; and
outputting, by the control unit, the suggested drive mode.

8. The method of claim 7, wherein when a plurality of possible-traveling paths for the vehicle are extracted, the expected consumed energy flow is extracted for each of the possible-traveling paths.

9. The method of claim 8, further comprising:
extracting, by the control unit, a possible-traveling path with the minimum energy consumption from the plurality of possible-traveling paths in consideration of the expected consumed energy flow extracted for each of the possible-traveling paths.

10. The method of claim 7, wherein the road state information is selected from a group consisting of geographical characteristics of the road and traffic rule information along the possible-traveling path. from a group consisting of real-time road traffic situation information and weather information.

11. The method of claim 7, wherein the real-time environmental information is selected from a group consisting of real-time road traffic situation information and weather information.

12. The method of claim 7, wherein the vehicle state information includes heat load state information of the vehicle.

13. A non-transitory computer readable medium containing program instructions executed by a processor or controller, the computer readable medium comprising:
program instructions that extract at least one possible-traveling path for the vehicle from an input destination;
program instructions that collect road state information related to the extracted possible-traveling path for the vehicle, real-time environmental information, and vehicle information;
program instructions that extract an expected consumed energy flow from the collected road state information, real-time environmental information, and vehicle information, wherein the expected consumed energy flow is extracted by;
  calculating a dynamic load state applied to the vehicle during virtual travel through the possible-traveling path from information received from the road information storage unit, the real-time information storage unit, and the vehicle information storage unit,
  calculating a fluid resistance state applied to the vehicle during virtual travel through the possible-traveling path from information received from the real-time information storage unit and the vehicle information storage unit,
  calculating a fuel consumption rate of the vehicle during virtual travel through the possible-traveling path from information on the calculated dynamic load state and fluid resistance state of the vehicle, and
  calculating a heat load state of the vehicle from information received from the vehicle information storage unit based on the expected energy flow in the vehicle;
program instructions that extract a suggested drive mode suitable for the expected consumed energy flow for the possible-traveling path and the traveling information from the plurality of drive modes; and
program instructions that output the suggested drive mode.

* * * * *